May 11, 1926.
C. E. NORTH
1,584,126
PROCESS OF EMULSIFYING AND CONVERTING FATS INTO CREAM
Filed Jan. 27, 1925
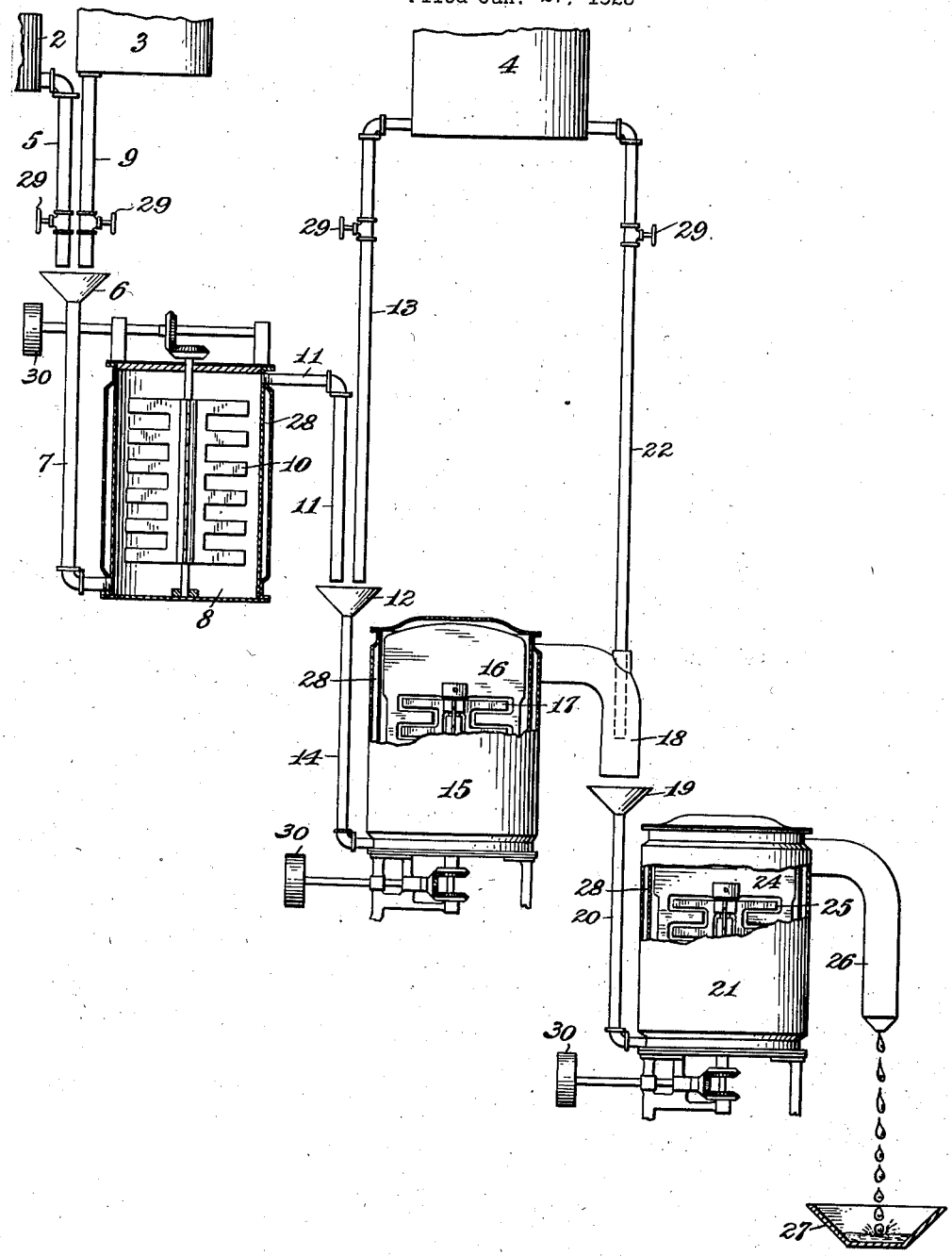
INVENTOR
Charles E. North
BY
Clarence D. Kerr
ATTORNEY Patented May 11, 1926.

1,584,126

UNITED STATES PATENT OFFICE.

CHARLES E. NORTH, OF MONTCLAIR, NEW JERSEY, ASSIGNOR TO THE MILK OIL CORPORATION, OF WILMINGTON, DELAWARE, A CORPORATION OF DELAWARE.

PROCESS OF EMULSIFYING AND CONVERTING FATS INTO CREAM.

Application filed January 27, 1925. Serial No. 5,173.

The figure of the drawing shows in elevation an arrangement of apparatus suitable for carrying out my invention.

My invention comprises a process and apparatus whereby milk oil or fats may be emulsified automatically and with extreme rapidity in a continuous operation.

I have found that for the emulsification of fats some mechanical agitation is necessary, for the purpose of mixing the emulsifying agents with the fat and of breaking up the substantially homogeneous fat or oil into smaller and smaller globules in which form they occur in the emulsion.

To effect the proper emulsification of fats, it is necessary to melt the fat so as to convert it into a homogeneous liquid mass. In the case of milk fat, if heated above 96° F. it melts into a yellowish oil. To form an emulsion of such an oil an emulsifying agent such as dried casein, or dried or condensed skimmed milk, with a suitable amount of water, must be mixed therewith. When such a mixture is agitated at a temperature which keeps the fats in liquid form the fat is broken up into smaller and smaller globules until they are of a size at which point an emulsion having permanent stability is formed. I have found that such a point is reached when the diameter of the globules is less than approximately 10 micro-millimeters.

The composition of the mixture and the fineness of the emulsion are factors which determine the extent of mixing required. For very coarse emulsions with high fat percentages only a slight amount of agitation is necessary, and the entire amount of the ingredients (fat, emulsifying agent and water) may be mixed at one time. For finer emulsions with lower percentages of fat a larger amount of agitation is necessary and the ingredients preferably are added in two or more steps.

Where it is desired to emulsify fats to produce a fluid cream having the same composition as natural cream from milk very satisfactory results may be obtained by dividing the process into three steps.

In the drawing, in which I have shown an arrangement of apparatus specifically designed to produce a fluid cream in a three-step operation, 2 indicates a container for the milk fats, which have been heated to a temperature sufficient to melt them into oil, 3 a receptacle for the emulsifying agent, and 4 a tank for hot water. The oil flows from the tank 2 through the valve controlled outlet pipe 5 into the funnel 6 of the inlet 7 of the mixer or agitator 8. The emulsifying agent also flows from its receptacle 3 through its valve controlled outlet 9 into the funnel 6. The oil and the emulsifying agent, preferably in the proportion of five parts of fat to one part of agent if skimmed milk is used, are mixed in the mixer or agitator 8, which I have shown in the form of a cylinder containing a set of paddles 10 revolving in the same direction.

The weight of the oil and skimmed milk fed through the inlet pipe 7 and the action of the paddle force the mixture to rise in the mixer and discharge into the outlet 11, which leads to the funnel 12 which also receives hot water from the valve controlled outlet 13 of the hot water tank 4. The mixture of oil and skimmed milk and the hot water (the quantity of water being by weight about one-fifth of the mixture) feeds from the funnel 12 through the inlet pipe 14 into the second machine 15.

The second machine 15 is preferably equipped with sets of oppositely rotating paddles 16 and 17, by which the mixture and the water are very thoroughly agitated so as to produce a thick paste, which, if desired, may be thoroughly emulsified, and in which the friction is sufficient to tear apart the fat into fine globules. The material as it is agitated is displaced upwardly by the pressure from the material which is being fed into the inlet pipe 14 and passes out of the machine into the outlet 18, which discharges into the funnel 19 of the inlet 20 of the third machine 21. A quantity of water sufficient to dilute the emulsified paste, which is the product of machine 15, to the consistency of natural fluid cream is also fed into the funnel 19 through the pipe 22.

The machine 21 is preferably a duplicate of the machine 15 and has similar sets of paddles 24 and 25, and in it the emulsified paste and the additional water are thoroughly mixed (and may, if desired, be further emulsified therein), and are discharged through the outlet 26 into the trough 27.

The three machines 8, 15 and 21 preferably have water jackets 28 for hot water by which the mixtures are kept at the proper temperatures. The feed pipes from the oil, skimmed milk and water holders 2, 3 and 4, are all equipped with valves 29. The operator by means of the driving mechanisms 30 can alter and vary the rates of revolution of the paddles in the various machines, and by manipulation of the valves 29 can control the rate of feed of the materials through the pipes 5, 9, 13, 22, and thereby is enabled to regulate the operation of the process and machines in such a way as to give best results.

The terms and expressions which I have employed are used as terms of description and not of limitation, and I have no intention, in the use of such terms and expressions, of excluding any equivalents of the features shown and described, or portions thereof, but recognize that various modifications are possible within the scope of the invention claimed.

What I claim is:

1. The process of emulsifying fats which comprises melting the fat into the form of an oil; adding an emulsifying agent to the oil, and continuously feeding the oil and agent into a vessel; agitating the materials therein to form an emulsion of very fine globules of fat separated by and coated with the emulsifying agent; and displacing the emulsion out of said vessel by the pressure of incoming materials.

2. The process of emulsifying fats which comprises continuously introducing the fat in the form of an oil into an agitating zone in the presence of an emulsifying agent; maintaining the zone in a heated condition; continuously agitating the oil to tear apart the fat and form it into minute globules of fat coated with the emulsifying agent, the globules of fat being of a size sufficiently small to ensure the stability of the emulsion, and withdrawing the product thereof continuously.

3. The process of emulsifying milk oil which comprises adding an emulsifying agent in the form of milk solids not fat to milk oil; feeding the mixture and water into an agitating zone; agitating it therein to break the oil into an emulsion formed of minute globules separated and coated by the emulsifying agent; and displacing the emulsion from the agitating zone by fresh charges of oil, the emulsifying agent and water, whereby the process is continuous.

4. The process of emulsifying milk oil which comprises adding an emulsifying agent in the form of milk solids not fat to milk oil; feeding the mixture and water into an agitating zone; agitating it therein to break the oil into an emulsion in the form of a thick paste comprising minute globules separated and coated by the emulsifying agent; displacing the emulsion from the agitating zone by fresh oil, emulsifying agent and water; adding water to the emulsion and introducing the mixture into another agitating zone; agitating the mixture therein to form an emulsion of the consistency of natural fluid cream; and displacing the emulsion out of the last mentioned zone by feeding thereinto fresh charges of the mixture.

5. The process of emulsifying milk oil which comprises adding dry skimmed milk to milk oil; feeding the mixture and water into an agitating zone; agitating it therein to break the oil into an emulsion formed of minute globules separated and coated by constituents of the dry skimmed milk; and displacing the emulsion from the agitating zone by fresh charges of the mixture.

6. The process of emulsifying milk oil which comprises adding skimmed milk in concentrated form to milk oil; feeding the mixture and water into an agitating zone; agitating it therein to break the oil into an emulsion formed of minute globules separated and coated by constituents of the skimmed milk; and displacing the emulsion from the agitating zone by fresh charges of the mixture.

CHARLES E. NORTH.